Jan. 12, 1965   J. M. HENNESS ETAL   3,164,990

FLOWMETERING

Filed Feb. 2, 1962

INVENTORS
JOHN M. HENNESS
BY DARRELL E. NEWELL

ATTORNEY

3,164,990
FLOWMETERING

John M. Henness and Darrell E. Newell, Davenport, Iowa, assignors to The Bendix Corporation, Davenport, Iowa, a corporation of Delaware
Filed Feb. 2, 1962, Ser. No. 170,561
3 Claims. (Cl. 73—228)

This invention relates to rate of flow metering.

Among its objects are the provision of flowmeters and flowmetering systems which have no rotating parts, offer minimum impedance to flow, have high reliability, high accuracy, which readily provide output signals in digital or analog form and which can be made to measure either mass or volumetric rate of flow.

Another object is to provide a flowmeter for cryogenic fluids which can be produced in a form not subject to vapor lock.

Other objects and advantages of the invention will be apparent from the following description of certain embodiments of the invention and the accompanying drawings. It is to be understood that various modifications in the embodiments shown and described, and that other embodiments of the invention, may be made without departing from the spirit of the invention or the scope of the appended claims.

Certain of these objects and advantages are realized in the invention by insertion of an electric capacitor in the fluid flowpath advantageously such that the fluid forms the capacitor dielectric and such that the volume of the dielectric is altered as a function of the force of the flowing fluid whereby the capacitance of the device varies as a function of mass rate of fluid flow.

Figure 1:
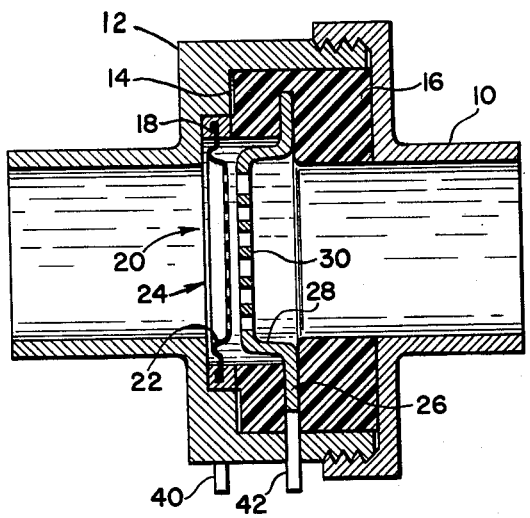
FIG. 1 is a cross-sectional view of a flowmetering device embodying the invention.

In its broadest sense the invention provides either volumetric or mass rate of flowmetering. The embodiment selected for illustration in FIG. 1 will measure mass rate of flow from left to right and volumetric rate of flow from right to left. In either event a capacitor is included such that the spacing between its electrodes changes with flow rate and, advantageously, such that this space is filled with the fluid. While not essential, the capacitor electrodes are preferably arranged such that the change in capacitor spacing is inversely proportional to the force of the flowing fluid across the entire cross sectional area. The preferred one of such arrangements is illustrated in FIG. 1 in which the numeral 10 designates a cylindrical flowpath formed as pipe with an intermediate section 12 of increased diameter. An inner shoulder 14 in this section and a generally cylindrical, insulating spacer 16 disposed in this section 12 combine to engage and clamp the outer flange 18 of a metallic diaphragm 20. The outer annular margin 22 of this diaphragm is formed with convolutions whereby to permit displacement along the flow axis of the central, heavily foraminated area 24 of the diaphragm the whole of which extends across the inner diameter of the section 12 in the plane normal to the flow direction. Parallel to the diaphragm 20, its annular flange 26 held in a groove formed on the inner periphery of the spacer 16 is a cup 28 whose foraminated flat bottom 30 is disposed in close proximity to the central portion 24 of diaphragm 20.

This central portion 24 and the cup bottom 30 serve as the capacitor electrodes. Being foraminated, as shown, or formed as screens or grids, they permit the passage of fluid without excessive impedance but nonetheless present sufficient area in juxtaposition to one another to form a capacitor whose characteristics are substantially those of opposed flat and solid plates. Thus the capacitance of the capacitor they form varies subsantially inversely as the spacing between them. In the embodiment selected for illustration, fluid whose flowrate is to be measured fills the dielectric space between them. Although it will be apparent that this is not essential if the constant of the dielectric is known and a separate capacitor is employed to measure the fluid density. In this case the measurements of the two capacitors are multiplied.

Cup 28, like diaphragm 20, is formed of any conductive material, such as the stainless steel shown, which is inert in the fluid being measured. It is sufficiently strong and rigid that it is not displaced under the heaviest fluid flow. On the other hand, the diaphragm 20 is readily displaced toward the cup bottom 30, as a substantially linear function in this embodiment, in proportion to the force exerted thereon by the flowing fluid.

Operation of the device is explained as follows; it being understood that density, P, and weight, W, are measured in British units (pounds).

The capacitance of the capacitor, C, where A is capacitor area and is element separation and Er is dielectric constant of the fluid, is defined by the expression:

$$C = KAEr/D$$

The dielectric constant of the fluid can be considered proportional in a ratio $K_1$ to fluid density $P/g$ as will be explained below. Then if K and $K_1$ are taken together as $K_2$:

$$C = K_2 AP/gD$$

In the embodiment shown a reduction in capacitor spacing D is opposed by the resilience of the diaphragm element 20 whereby the reduction in spacing, and the increase in capacitance C incident thereto varies with the force exerted on the element 20 by the flow of fluid.

By Newton's second law of motion, force, F, equals weight, W, over the acceleration of gravity, g, times acceleration. Since acceleration is the differential of velocity, V, with respect to time, t, we may write:

$$F = (W/g)(dV/dt)$$

or $$Fdt = (W/g)dV$$

Integrating from time zero to time t:

$$Ft = (W/g)(V - Vo)$$

Ft is called impulse of force and $WV/g$ is called momentum.

Next we may rewrite this expression in terms of the weight rate of fluid flow. This rate equals the volumetric rate of flow (or cross-sectional area A of the flow stream times flow velocity V) times the specific densiyt $P/g$ or $AVP/g$. Thus the mass of flow in time t is $AVPt/g$.

Then the expression for impulse and momentum becomes:

$$Ft = (AVPt/g)(V - Vo)$$

and $$F = (AVP/g)(V - Vo)$$

The quantity $AVP/g$ being the mass per second, the right hand side of this expression is the change in momentum per second. Thus the force exerted on an obstruction is the rate of change of momentum produced by the obstruction.

Whatever the construction of the obstruction, its geometry being fixed such that fluid direction changes with the first power of velocity only, there will be a given change in fluid velocity described in terms of change in a given direction of a given portion of the fluid. Then the obstruction can be considered in terms of an equivalent obstruction which changes by 90 degrees the direction of a proportionate part, described by the ratio $K_3$, of the fluid.

Then the quantity $(V-Vo)$ may be written $K_3V$ and the force expression becomes:

$$F=(AVP/g)(K_3V)$$

in which the V's have the same value whereby $$F=K_3AV^2P/g$$

and the force is proportional to fluid momentum for a fixed obstruction geometry.

The separation of the capacitor plates D is diminished in proportion to the force F.

If D varies inversely with F so that $D=K_4/F$ then $$C=K_2AP/gK_4/AV^2P/g$$

or $$C=K_5A^2P^2V^2/g^2$$

Capacitance of the capacitor formed by diaphragm 20 and cup 28 is then variable with the product of fluid dielectric constant and momentum or, in terms of mass flow rate, the product of mass flow rate, $APV/g$, the fluid velocity V, and the fluid density $P/g$ (actually $AP/g$ but A is a constant).

The capacitor elements 24 and 30 are connected electrically to terminals 40 and 42, respectively, in FIG. 1. These terminals are arranged for connection to the oscillator terminals 44 and 46 in FIG. 2 such that the capacitor formed by elements 24 and 30 is the capacitive element in the frequency determining network of the oscillator. The operating frequency, $fr$, of the oscillator being defined by the general expression:

$$fr=1/K_6\sqrt{LC}$$

since $C=K_5A^2P^2V^2/g^2$, the oscillator frequency is expressed as follows:

$$fr=1/(K_7\sqrt{L}\sqrt{A^2V^2P^2/g^2})$$

or if L is held constant:

$$fr=(1/K_8)(g/APV)=K_9/APV$$

Thus the oscillator comprises one means for finding the square route of $A^2P^2V^2/g^2$.

Since APV is proportional to mass rate of flow, the change in oscillator frequency is inversely proportional to the change in mass flow rate. Having accounted for the constant $K_7$, oscillator frequency is inversely proportional to mass flow rate. The output of the oscillator is a signal representing flow rate and it can be considered to be a digital signal.

The foregoing analysis assumed that dielectric constant varies substantially linearly with density. The Clausuis-Mosotti equation relates the two as follows:

$$(Er-1/Er+2)1/P=Q$$

where $Er$ is dielectric constant, P is density and Q is specific polarization. The equation assumes that the molecules of the substance are non-polar and spherical, that there are no short range interactions between molecules and that the spacial distribution is isotropic. However, if the first condition is met, errors due to failure of the other assumptions diminish with density. Thus hydrogen, which meets only the first assumption, has a very closely linear relation between its dielectric constant and density.

Stated another way, to the extent that Q is constant for a material, that material is said to obey the equation. Even if Q does change with density in a given material, if the change in density is restricted, $Kf$ may be assumed to be constant and the meter will have a degree of accuracy proportional to the restriction of the range of density values.

Since one object of the invention is to provide a meter for cryogenic fluids it is of particular interest that the relation of density to dielectric constant is very close to a linear one for liquid: hydrogen, the noble substances, oxygen, nitrogen, carbon dioxide, and methane, as well as many other substances.

If the flow direction through the instrument is reversed, then $D\simeq F$ and $C\simeq KEr/PV^2$. Since $Er\simeq P$, then $C\simeq 1/V^2$. If oscillator inductance, L, is constant then oscillator frequency being $fr\simeq K/\sqrt{LC}$, becomes $Fr\simeq V$. Thus the oscillator output is a digital signal proportional to velocity which, in a flowpath of fixed dimensions, is proportional to volumetric flow rate.

Figure 3:
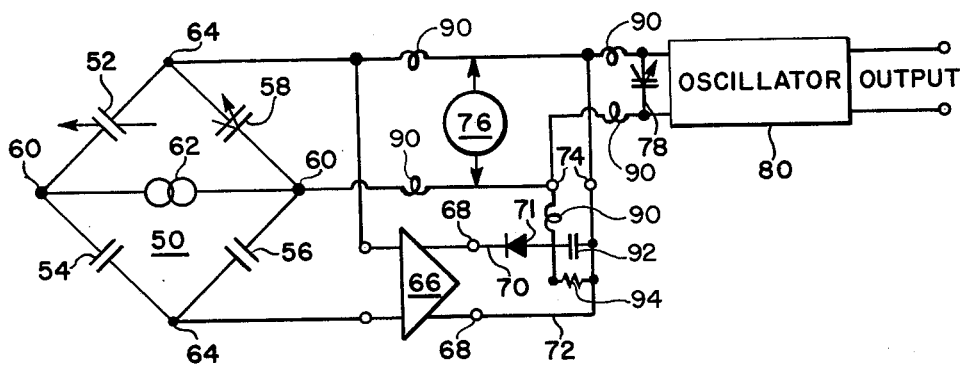
FIG. 3 is a drawing partly schematic and partly diagrammatic of a flowmetering system embodying the invention.

An alternative metering system is shown in FIGURE 3 to comprise a bridge circuit 50 having the flowmeter of FIGURE 1, operating as a mass flowrate meter in one leg where it is designated by the numeral 52, the other legs include two like impedances 54 and 56 and a semi-conductor junction in the form of a diode 58. Terminals 60 of the bridge are energized from an alternating power source 62. The output terminals 64 are connected to the input terminals of an amplifier 66 having output terminals 68 connected to lines 70 and 72. The line 70 includes a diode rectifier 71 whereby a unidirectional voltage proportional to bridge unbalance appears at points 74 at the end of lines 70 and 72. This voltage is applied across the diode 58. Since the capacitive reactance of the diode junction varies inversely as a function of the D.C. voltage impressed across it, this circuit comprises a feedback loop by which the bridge 50 is maintained at null.

The voltage across points 74 is proportional then to the capacitance of the meter 52 and this voltage is applied across a second semi-conductor junction in the form of a diode 78 to change the capacitive reactance it exhibits. The diode is employed as a frequency control element in the oscillator 80 in which it is connected. As in the case of the oscillator of FIGURE 2, the frequency of oscillator 80 is inversely proportional to mass rate of fluid flow through the meter.

The voltage across points 74 is also applied to a D.C. meter 76 to provide an analog signal proportional to mass flow rate. The meter 76 may be, as shown, a simple D'Arsenval movement meter whose dial is calibrated in units of mass flow rate.

Figure 2:
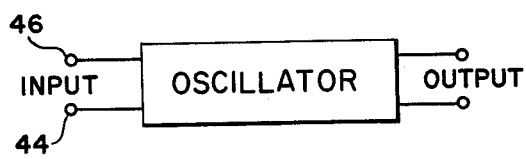
FIG. 2 is a diagram of an oscillator.

The system of FIG. 3 has the advantage over the system comprising the instrument of FIG. 1 and the oscillator of FIG. 2, that the meter and oscillator are isolated permitting greater accuracy and in that it can be arranged to measure a greater range of flow rates. This is not to imply that the simple combination of the meter of FIG. 1 and oscillator of FIG. 2 is not practical. In actual tests, a meter like the one illustrated in FIG. 1 and connected to a transistor oscillator whose frequency was measured in a conventional frequency counter, was used to measure the mass rate of fluid flow of the liquids oxygen, kerosene, and JP-4 fuel, over a range of flows exceeding ten to one. Error was less than two percent, measured with instruments having a maximum error of one percent, in the case of each liquid and repeatability in each case was better than 99 percent.

In FIG. 3 the function of radio frequency chokes 90 and capacitor 92 is to provide high frequency isolation for oscillator 80. Resistor 94 completes a return path for the direct current component of the output of rectifier 71.

We claim:

1. A flowmetering system for measuring the mass rate of fluid flow comprising means sensitive to the density of said fluid and to the momentum of said fluid including a capacitor whose electrodes are immersed in said fluid and whose electrodes are subjected to fluid momentum in a direction to diminish electrode spacing in accordance with fluid momentum for providing a signal variable with their product in the form of an electrical reactance;

and means for providing a signal variable as a function of the square root of said first mentioned signal comprising an oscillator of the type including a frequency determining network in which frequency is determined by the square root of the product of inductance and capacitance in said frequency determining network and means for applying said first mentioned signal to said frequency determining network to alter the product of its inductance and capacitance.

2. In a flowmeter, a fluid flowpath and means for providing an electrical reactance variable with fluid flow rate comprising spaced conductive elements, means rendering said elements responsive to the force of fluid flow through said flowpath to move relatively to one another in a direction to alter the reactance to alternating current exhibitable by said elements, means insuring that fluid of the kind whose flow rate is to be measured is disposed in the dielectric space between said elements, and indicating means for connection to said elements and responsive to their reactance for providing signals indicative of fuel flow rate, in which said indicating means comprises, an electrical bridge including means for connecting said elements in one leg of the bridge and a semiconductor junction in another leg, means responsive to bridge unbalance for applying a unidirectional voltage across said junction to alter the capacitive reactance of said junction in an amount sufficient to balance the bridge, and means responsive to said unidirectional voltage for indicating fluid flow rate.

3. A flowmeter for fluids comprising a flowpath, a capacitor in said flowpath comprising capacitor electrodes mounted such that the fluid fills the dielectric space between said electrodes, said electrodes extending across the flowpath and having openings permitting flow therethrough and being relatively movable in response to fluid flow along said flowpath to alter the spacing of said electrodes as a function of fluid density and fluid velocity squared, said flowmeter further comprising an electronic oscillator in which said capacitor comprises a frequency controlling element.

References Cited in the file of this patent

UNITED STATES PATENTS

| | | |
|---|---|---|
| 2,266,316 | Martin et al. | Dec. 16, 1941 |
| 2,575,492 | Dittmann | Nov. 20, 1951 |
| 2,703,493 | Deboisblanc | Mar. 8, 1955 |

FOREIGN PATENTS

| | | |
|---|---|---|
| 333,625 | Great Britain | Aug. 18, 1930 |